Patented Nov. 1, 1938

2,134,824

UNITED STATES PATENT OFFICE 2,134,824

PROCESS OF TREATING HYDROCARBONS

William G. Hiatt, Bartlesville, Okla., assignor to Phillips Petroleum Company, Bartlesville, Okla., a corporation of Delaware No Drawing. Application May 9, 1935,
Serial No. 20,702

6 Claims. (Cl. 196—27)

This invention relates to improvements in a process of treating hydrocarbon oils and relates particularly to improvements in a process for desulfurizing petroleum oils by treatment in the vapor phase with a contact catalyst.

An object of the present invention is to lengthen the effective life of contact catalyst used in vapor phase desulfurization processes by preventing or minimizing the "wetting" of the catalyst particles with liquid condensed from the vapors during treatment.

Another object of this invention is to prevent or minimize the condensation of vapors during treatment with contact catalysts without substantially increasing the temperature of the vapors during the treatment.

Other objects and advantages of the invention will be apparent during the course of the following description.

Hydrocarbon oils, particularly petroleum oils, may be effectively desulfurized by treatment in the vapor phase with various contact catalysts, particularly those of the clay type, such as bauxite, hydro-silicates of aluminum, such as fuller's earth and the like, and the oxides of chromium, vanadium, molybdenum, tungsten, cadmium and zinc, at temperatures above 600° F., but preferably below a temperature at which substantial decomposition of the hydrocarbon constituents of the oil will occur. In practicing such a process it is found desirable in many cases, to treat a mixture of petroleum fractions having a normal mean boiling temperature above 600° F. at substantially such normal mean boiling temperature, since under such conditions the mixture of fractions when vaporized in a conventional manner, such as by flash distilling in a pipe still, will have a normal vapor temperature within the desired treating range. Vapor mixtures evolved in this manner are normally at their dew-points and when passed through a contact catalyst, for purposes of desulfurization, are cooled to some extent causing condensation of some of the heavier fractions within the body of the catalyst, resulting in wetting of the catalyst surfaces with a resulting deactivation of the catalyst. In order to prevent or minimize the condensation of vapors in the catalyst body without resorting to additional heating of the vapors or catalyst bed, it has been found highly expedient to depress the dew-point of the vapor mixture by diluting the mixture with an inert gas or vapor which has been brought to substantially the same temperature as the vapor mixture prior to the dilution step.

Various gases and/or vapors such as steam, nitrogen, carbon dioxide and other gases or vapors which are inert at the temperatures and under the conditions of this process may be used. Steam is the more preferable of these gases and vapors under most conditions.

The extent of the lowering of the dew-point will be dependent upon the composition of the vapor mixture and on other conditions encountered in practice which affect the cooling of the vapors in contact with the catalyst, and may be controlled by regulating the ratio of inert gas to the vapor mixture to be treated.

The following example will serve to illustrate the advantages of my invention and a method whereby the aforesaid objects of my invention may be fulfilled. Since the process may be conducted in conventional apparatus no drawing will be necessary for a clear understanding of the invention.

Petroleum oil comprising a mixture of constituents having a normal mean boiling point above 600° F. will be heated in a conventional pipe still to a temperature of about 750° F. and will flow through the pipe still at sufficient velocity to prevent cracking of the oil in passage through the pipe still. The heated mixture will be flashed in a suitable evaporator and a mixture of constituents having a normal mean boiling temperature of about 720° F. will evaporate therein and will separate from unvaporized liquid. The heating and flashing operations will be conducted at substantially atmospheric pressure or only slightly above so that the vapor mixture separated will be at substantially its normal mean boiling temperature, namely 720° F. Steam, superheated to approximately 720° F., will then be mixed with the oil vapors and the total mixture passed through a bed of crushed bauxite, heated solely by the temperature of the vapors passing therethrough. Although there will be a small drop in temperature of the mixture in passing through the catalyst, there will be no appreciable condensation of oil vapors within the catalyst, the effectiveness of the catalyst consequently being greatly lengthened thereby. The treated vapors are then conducted to suitable fractionation and condensation equipment, where the steam and oil may be condensed, the oil fractionated into its constituents if desired and the steam separated from the oil.

The temperature for the contact treatment of most oils by the above process is generally above about 600° F. and below about 800° F.

My new invention may be practiced in conjunction with the treatment of various petroleum oils by the above described process.

Other modifications of my invention will be apparent to those skilled in the art and I desire to claim all variations thereof which come within the scope of my invention.

I claim:

1. In a process of desulfurizing petroleum oils which comprises passing a mixture of vaporized fractions thereof having a normal mean boiling temperature above 600° F. in contact with a catalyst of the clay type maintained substantially at said mean boiling temperature by the temperature of the vapors passing therethrough, the improvement which consists in preventing condensation of said vaporized fractions while in contact with said catalyst by diluting said vapors with an inert gas heated to substantially said mean boiling temperature.

2. In a process of desulfurizing petroleum oils which comprises passing a mixture of vaporized fractions thereof having a normal mean boiling temperature above 600° F. in contact with a catalyst of the clay type maintained substantially at said mean boiling temperature by the temperature of the vapors passing therethrough, the improvement which consists in diluting said vapors prior to contact with said catalysts with an inert gas heated to substantially said mean boiling temperature.

3. In a process of desulfurizing petroleum oils which comprises passing a mixture of vaporized fractions thereof having a normal mean boiling temperature above 600° F. in contact with a catalyst of the clay type maintained substantially at said mean boiling temperature by the temperature of the vapors passing therethrough, the improvement which consists in lowering the dewpoint of said vapors by diluting said vapors with an inert gas heated to substantially said mean boiling temperature.

4. In a process for the treatment of petroleum oils which comprises passing a mixture of vaporized fractions thereof having a normal mean boiling temperature above 600° F. in contact with a catalyst of the clay type maintained substantially at said mean boiling temperature by the temperature of the vapors passing therethrough, the improved method of minimizing condensation of said vapors during said treatment by diluting said vapors with an inert gas heated to substantially said mean boiling temperature.

5. In a process of desulfurizing petroleum oils which comprises passing a mixture of vaporized fractions thereof having a normal mean boiling temperature above 600° F. while substantially at their dew point in contact with a catalyst of the clay type without application of extraneous heat to said catalyst, the step of lowering the dew point of said vapors by diluting them with an inert gas heated to substantially said mean boiling temperature prior to contact with said catalyst.

6. In a process of desulfurizing petroleum oils which comprises vaporizing said oils, separating vapor fractions thereof having a mean boiling temperature above 600° F. but below 800° F. while substantially at their dew point, diluting said vaporized fractions with an inert gas heated to said mean boiling temperature to lower the dew point of said fractions, and passing the diluted vapors in contact with a catalyst of the clay type.

WILLIAM G. HIATT.